(12) United States Patent
Chang

(10) Patent No.: US 8,914,587 B2
(45) Date of Patent: Dec. 16, 2014

(54) MULTI-THREADED MEMORY OPERATION USING BLOCK WRITE INTERRUPTION AFTER A NUMBER OR THRESHOLD OF PAGES HAVE BEEN WRITTEN IN ORDER TO SERVICE ANOTHER REQUEST

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 143 days.

(21) Appl. No.: 13/095,909

(22) Filed: Apr. 28, 2011

(65) Prior Publication Data
US 2012/0210045 A1 Aug. 16, 2012

(30) Foreign Application Priority Data
Feb. 15, 2011 (TW) .............................. 100104919 A

(51) Int. Cl.
*G06F 12/00* (2006.01)
*G06F 12/02* (2006.01)
*G06F 13/16* (2006.01)

(52) U.S. Cl.
CPC ........ *G06F 12/0246* (2013.01); *G06F 13/1605* (2013.01); *G06F 13/1626* (2013.01); *G06F 13/1663* (2013.01); *G06F 2213/0038* (2013.01)
USPC .......................................................... 711/151

(58) Field of Classification Search
CPC ... G06F 3/0659; G06F 3/0679; G06F 3/0688; G06F 13/1605; G06F 13/1626; G06F 13/1663; G06F 12/0246; G06F 12/0804
See application file for complete search history.

(56) References Cited

U.S. PATENT DOCUMENTS

| | | | | |
|---|---|---|---|---|
| 7,062,615 | B2 * | 6/2006 | Miller et al. | 711/152 |
| 7,650,453 | B2 * | 1/2010 | Torii | 710/240 |
| 8,127,086 | B2 * | 2/2012 | Jacobs et al. | 711/147 |
| 8,209,439 | B2 * | 6/2012 | Marcu et al. | 710/6 |
| 2005/0050283 | A1 | 3/2005 | Miller et al. | |
| 2005/0114609 | A1 * | 5/2005 | Shorb | 711/152 |
| 2009/0070769 | A1 * | 3/2009 | Kisel | 718/104 |
| 2010/0088476 | A1 * | 4/2010 | Inagaki et al. | 711/152 |
| 2010/0100690 | A1 * | 4/2010 | Rajamani et al. | 711/152 |
| 2010/0274949 | A1 | 10/2010 | Yeh | |
| 2011/0138135 | A1 * | 6/2011 | Dice et al. | 711/152 |
| 2011/0252185 | A1 * | 10/2011 | Arya | 711/103 |

OTHER PUBLICATIONS

"Office Action of China Counterpart Application", issued on Jun. 10, 2014, p. 1-p. 3.

* cited by examiner

*Primary Examiner* — April Y Blair
*Assistant Examiner* — Michael C Kolb
(74) *Attorney, Agent, or Firm* — Jianq Chyun IP Office

(57) ABSTRACT

A data access method for accessing a rewritable non-volatile memory module via a data bus through a first and a second thread module, and a memory controller and a memory storage apparatus using the same are provided. In the present method, an access executing right is assigned to the second thread module to write page data. Whether an access command to be executed by the first thread module is received is determined when the second thread module writes a predetermined amount of page data into a predetermined number of physical pages. The access executing right is assigned to the first thread module when the access command is received, so that the first thread module executes the access command in a foreground mode and the second thread module executes an ongoing task in a background mode. Thereby, timeout caused by delayed response of the first thread module is effectively avoided.

12 Claims, 9 Drawing Sheets

MULTI-THREADED MEMORY OPERATION USING BLOCK WRITE INTERRUPTION AFTER A NUMBER OR THRESHOLD OF PAGES HAVE BEEN WRITTEN IN ORDER TO SERVICE ANOTHER REQUEST

CROSS-REFERENCE TO RELATED APPLICATION

This application claims the priority benefit of Taiwan application serial no. 100104919, filed Feb. 15, 2011. The entirety of the above-mentioned patent application is hereby incorporated by reference herein and made a part of this specification.

BACKGROUND

1. Technology Field

The invention generally relates to a data access method, and more particularly, to a data access method for accessing a rewritable non-volatile memory module through a plurality of thread modules and a memory controller and a memory storage apparatus using the same.

2. Description of Related Art

Along with the widespread of digital cameras, cell phones, and MP3 in recently years, the consumers' demand to storage media has increased drastically. Rewritable non-volatile memory is one of the most adaptable memories for portable electronic products (for example, notebook computers) due to its characteristics such as data non-volatility, low power consumption, small volume, non-mechanical structure, and high access speed. A solid state drive (SSD) is a storage apparatus which uses a flash memory as its storage medium. Thus, in recent years, the flash memory industry has become a major part of the electronic industry.

A rewritable non-volatile memory storage apparatus has a plurality of physical blocks, and each of the physical blocks has a plurality of physical pages. While writing data into a physical block, the data has to be written according to the sequence of the physical pages in the physical block. In addition, a physical page containing data should be erased before it is used for writing new data. In particular, because physical block is the smallest erasing unit and physical page is the smallest programming (writing) unit, physical blocks in a flash memory storage system are usually grouped into a data area and a spare area.

Physical blocks in the data area are used for storing data written by a host system. To be specific, the memory management circuit converts logical access addresses to be accessed by the host system into logical pages of logical blocks and maps the logical pages of the logical blocks to the physical pages of the physical blocks in the data area. Namely, in the management of a flash memory module, the physical blocks in the data area are considered physical blocks that have been used (for example, already contain data written by the host system). For example, the memory management circuit records the mapping relationship between the logical blocks and the physical blocks of the data area by using a logical block-physical block mapping table, wherein the logical pages in a logical block sequentially correspond to the physical pages in the physical block mapped to the logical block.

Physical blocks in the spare area are used for substituting the physical blocks in the data area. To be specific, as described above, a physical block already containing data has to be erased before it is used for writing new data, and the physical blocks in the spare area are designed for writing update data to replace the physical blocks originally mapped to the logical blocks. Accordingly, the physical blocks in the spare area are blank or available physical blocks (i.e., no data is recorded therein or data recorded therein is already marked as invalid data).

Since the physical blocks of the data area and the physical blocks of the spare area are alternatively used for storing data written by the host system, in order to allow the host system to smoothly access the physical blocks alternatively used for storing data, the rewritable non-volatile memory storage apparatus provides logical blocks and corresponds the logical access addresses to be accessed by the host system to the logical pages in these logical blocks. To be specific, the rewritable non-volatile memory storage apparatus converts the logical access addresses to be accessed by the host system into corresponding logical blocks and records and updates the mapping relationship between the logical blocks and the physical blocks of the data area in the logical block-physical block mapping table to reflect the alternation of the physical blocks. Thus, the host system simply accesses the logical access addresses while the flash memory storage system actually reads data from or writes data into the corresponding physical blocks according to the logical block-physical block mapping table.

To be specific, when the host system is about to store data into a logical access address, the control circuit of the flash memory storage system identifies the logical block corresponding to the logical access address, selects a physical block from the spare area, and writes the new data into the physical block selected from the spare area (also referred to as a child physical block) to replace the physical block originally mapped to the logical block (also referred to as a mother physical block). Herein the operation of mapping a logical block to a mother physical block and a child physical block is referred to as opening mother-child blocks. Thereafter, when the host system is about to write data into another logical block, the flash memory storage system has to perform a data merging procedure to merge the valid data that are stored in the mother physical block and the child physical block mapped to this logical block (i.e., merge the data belonging to the logical block into a single physical block).

For example, in the data merging procedure, the rewritable non-volatile memory storage apparatus copies valid data in the mother physical block to the child physical block and re-maps the logical block to the child physical block (i.e., associates the child physical block with the data area). In addition, the rewritable non-volatile memory storage apparatus erases the original mother physical block in the data area and links it to the spare area.

Along with the increase in the capacity of each logical block, the rewritable non-volatile memory storage apparatus needs to spend more time to perform aforementioned data merging procedure, so as to execute a next write command. In addition, when a single data bus is disposed in a memory storage apparatus for connecting the control circuit and the rewritable non-volatile memory module and a plurality of thread modules is disposed for accessing the rewritable non-volatile memory module, because these thread modules transmit data by sharing the single data bus, even more time is required for executing a write command. For example, if a background thread module for processing data accesses in a background mode is executing aforementioned data merging procedure to write data and a foreground thread module receives a write command from the host system, the foreground thread module has to wait until the background thread module finishes the data merging procedure before it starts to execute the write command. In particular, the foreground thread module may also need to execute a data merging procedure before executing the write command. Thus, the time required for executing the write command becomes too long and accordingly the foreground thread module cannot respond to the host system in time. As a result, a timeout problem is caused.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the invention is directed to a data access method, a memory controller, and a memory storage apparatus, wherein timeout is avoided when a non-volatile memory module is accessed by multiple threads.

According to an exemplary embodiment of the invention, a data access method for accessing a rewritable non-volatile memory module through a plurality of thread modules is provided. The rewritable non-volatile memory module has a plurality of physical blocks, and each of the physical blocks has a plurality of physical pages arranged with a sequence. The thread modules include a first thread module and a second thread module. The second thread module executes a write command to write pieces of page data into a second physical block among the physical blocks. The data access method includes assigning an access executing right to the second thread module and writing a predetermined amount of page data among the page data into a predetermined number of physical pages in the second physical block via a data bus by using the second thread module, wherein the second thread module releases the access executing right after writing the predetermined amount of page data into the second physical block via the data bus, and the predetermined number is smaller than the number of physical pages in any one of the physical blocks. The data access method also includes determining whether an access command needed to be executed by the first thread module is received after the second thread module releases the access executing right. The data access method further includes assigning the access executing right to the first thread module and executing the access command on a first physical block among the physical blocks by using the first thread module when the access command needed to be executed by the first thread module is received, wherein the first thread module releases the access executing right after executing the access command.

According to an exemplary embodiment of the invention, a data access method for accessing a rewritable non-volatile memory module through a plurality of thread modules is provided. The rewritable non-volatile memory module has a plurality of physical blocks, and each of the physical blocks has a plurality of physical pages arranged with a sequence. The thread modules include a first thread module and a second thread module. The second thread module executes a write command to write pieces of page data into a second physical block among the physical blocks. The data access method includes determining the amount of unwritten page data among the page data is smaller than a predetermined threshold. The data access method also includes assigning the access executing right to the second thread module and writing the unwritten page data into the second physical block via a data bus by using the second thread module when the amount of the unwritten page data is smaller than the predetermined threshold. The data access method further includes determining whether an access command needed to be executed by the first thread module is received when the amount of the unwritten page data is not smaller than the predetermined threshold. The data access method still includes assigning the access executing right to the first thread module and executing the access command on a first physical block among the physical blocks via the data bus by using the first thread module when the access command needed to be executed by the first thread module is received, wherein the first thread module releases the access executing right after executing the access command.

According to an exemplary embodiment of the invention, a memory controller for controlling a rewritable non-volatile memory module is provided. The rewritable non-volatile memory module has a plurality of physical blocks, and each of the physical blocks has a plurality of sequentially arranged physical pages. The memory controller includes a memory interface and a memory management circuit. The memory interface is configured to couple to the rewritable non-volatile memory module. The memory management circuit is coupled to the memory interface and executes a write command to write pieces of page data into a second physical block among the physical blocks. Herein the memory management circuit includes a first thread module, a second thread module, and a resource allocation module coupled to the first thread module and the second thread module. The resource allocation module assigns an access executing right to the second thread module, and the second thread module writes a predetermined amount of the page data into a predetermined number of physical pages in the second physical block via a data bus, wherein the second thread module releases the access executing right after writing the predetermined amount of page data into the second physical block via the data bus, and the predetermined number is smaller than the number of physical pages in any one of the physical blocks. In addition, after the second thread module releases the access executing right, the resource allocation module determines whether an access command to be executed by the first thread module is received. When the access command needed to be executed by the first thread module is received, the resource allocation module assigns the access executing right to the first thread module, and the first thread module executes the access command on a first physical block among the physical blocks via the data bus, wherein the first thread module releases the access executing right after executing the access command.

According to an exemplary embodiment of the invention, a memory controller for controlling a rewritable non-volatile memory module is provided. The rewritable non-volatile memory module has a plurality of physical blocks, and each of the physical blocks has a plurality of sequentially arranged physical pages. The memory controller includes a memory interface and a memory management circuit. The memory interface is configured to couple the rewritable non-volatile memory module. The memory management circuit is coupled to the memory interface and executes a write command to write pieces of page data into a second physical block among the physical blocks. Herein the memory management circuit includes a first thread module, a second thread module, and a resource allocation module coupled to the first thread module and the second thread module. The resource allocation module determines whether the amount of unwritten page data in the page data is smaller than a predetermined threshold. When the amount of the unwritten page data is smaller than the predetermined threshold, the resource allocation module assigns an access executing right to the second thread module, and the second thread module writes the unwritten page data into the second physical block via the data bus. On the other hand, when the amount of the unwritten page data is not smaller than the predetermined threshold, the resource allocation module determines whether an access command to be executed by the first thread module is received. When the access command needed to be executed by the first thread module is received, the resource allocation module assigns the access executing right to the first thread module, and the first thread module executes the access command on a first physical block among the physical blocks via the data bus, wherein the first thread module releases the access executing right after executing the access command.

According to an exemplary embodiment of the invention, a memory storage apparatus including the rewritable non-volatile memory module and the memory controller described above is provided.

As described above, exemplary embodiments of the invention provide a data access method, a memory controller, and a memory storage apparatus, wherein timeout is effectively avoided when a rewritable non-volatile memory module is executed by multiple threads.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
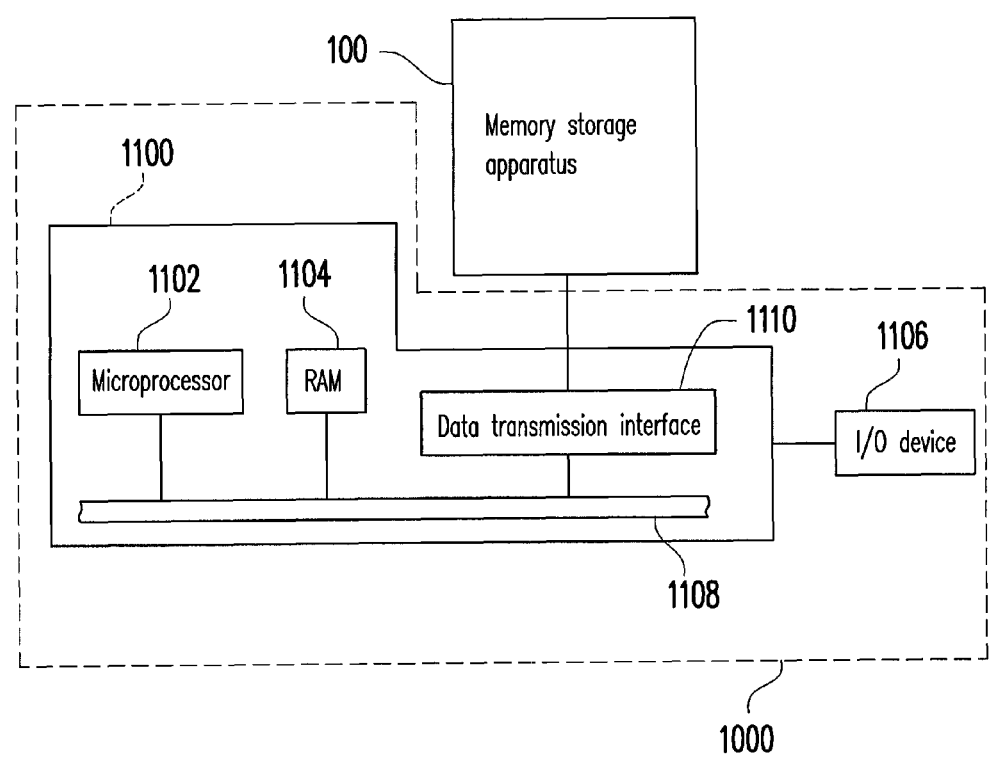
FIG. 1A illustrates a host system and a memory storage apparatus according to a first exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

[First Exemplary Embodiment]

FIG. 1A illustrates a host system and a memory storage apparatus according to the first exemplary embodiment of the invention.

Figure 1B:
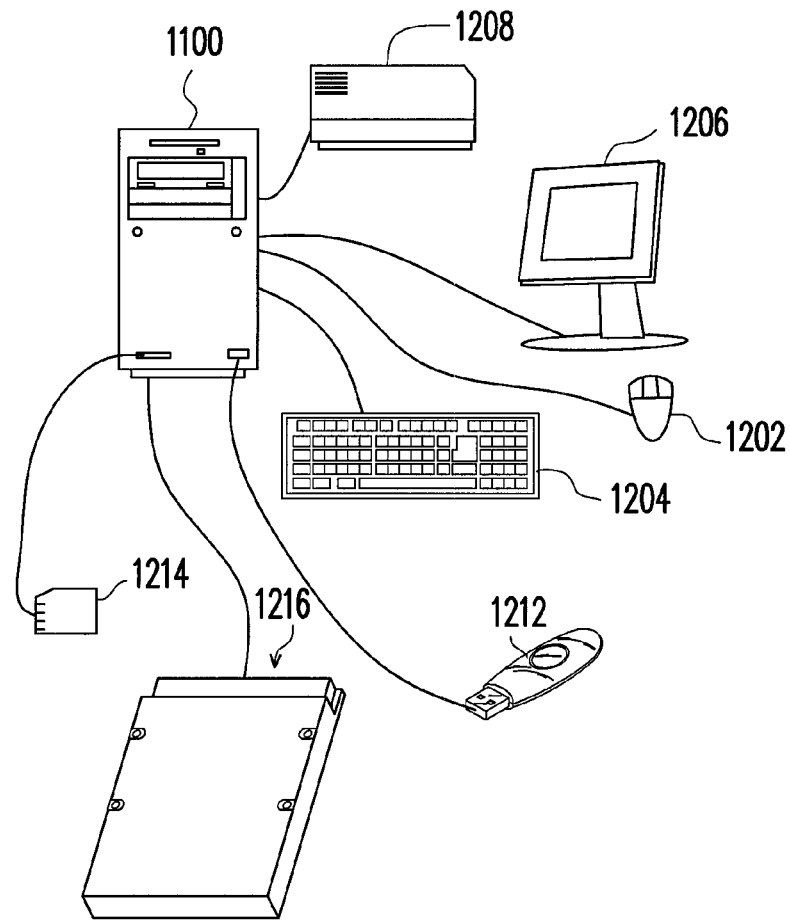
FIG. 1B is a diagram illustrating a computer, an input/output (I/O) device, and a memory storage apparatus according to an exemplary embodiment of the invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/O device 1106 is not limited to the devices illustrated in FIG. 1B and may further include other devices.

In the present embodiment, the memory storage apparatus 100 is coupled to other components of the host system 1000 through the data transmission interface 1110. Data can be written into or read from the memory storage apparatus 100 through the operations of the microprocessor 1102, the RAM 1104, and the I/O device 1106. For example, the memory storage apparatus 100 may be a non-volatile memory storage apparatus, such as the flash drive 1212, the memory card 1214, or the solid state drive (SSD) 1216 illustrated in FIG. 1B.

Figure 1C:
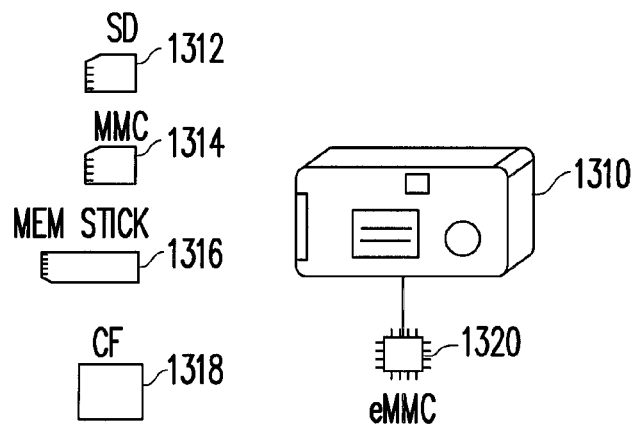
FIG. 1C is a diagram illustrating a host system and a memory storage apparatus according to another exemplary embodiment of the invention.

Generally speaking, the host system 1000 can be substantially any system that can store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the non-volatile memory storage apparatus is a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that the eMMC is directly coupled to the motherboard of the host system.

Figure 2:
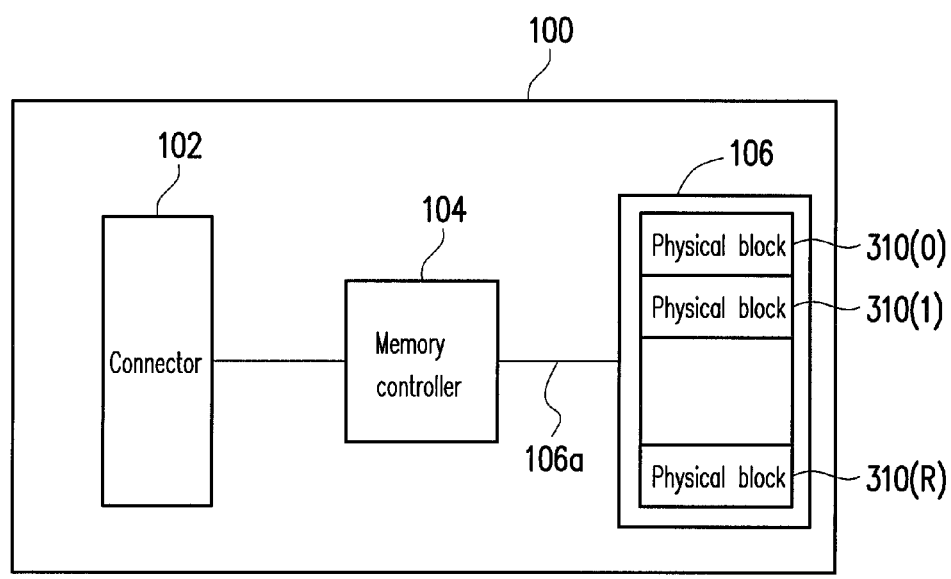
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a rewritable non-volatile memory module 106.

In the present exemplary embodiment, the connector 102 is a SD connector. However, the invention is not limited thereto, and the connector 102 may also be a universal serial bus (USB) connector, an Institute of Electrical and Electronic Engineers (IEEE) 1394 connector, a peripheral component interconnect (PCI) express connector, a serial advanced technology attachment (SATA) connector, a MS connector, a MMC connector, a CF connector, an integrated device electronics (IDE) connector, or any other suitable connector.

The memory controller 104 executes a plurality of logic gates or control instructions implemented in a hardware form or a firmware form and performs various data operations on the rewritable non-volatile memory module 106 according to commands from the host system 1000.

The rewritable non-volatile memory module 106 is coupled to the memory controller 104 and configured to store data written by the host system 1000. In particular, the rewritable non-volatile memory module 106 is coupled to the memory controller 104 through a single data bus 106a.

The rewritable non-volatile memory module 106 has physical blocks 310(0)-310(R). Each of the physical blocks has a plurality of physical pages. The physical pages belonging to the same physical blocks can be individually written but have to be erased all together. Each physical block may be composed of 128 physical pages. However, the invention is not limited thereto, and each physical block may also be composed of 64, 256, or any other number of physical pages.

To be specific, the physical block is the smallest unit for erasing data. Namely, each physical block contains the least number of memory cells that are erased all together. The physical page is the smallest unit for programming data. Namely, the physical page is the smallest unit for writing data. However, in another exemplary embodiment of the invention, the smallest unit for writing data may also be a sector or any other unit. Each physical page usually includes a data bit area D and a redundant bit area R. The data bit area D is used for storing user data, and the redundant bit area R is used for storing system data (for example, error checking and correcting (ECC) codes).

In the present exemplary embodiment, the rewritable non-volatile memory module 106 is a multi level cell (MLC) NAND flash memory module. However, the invention is not limited thereto, and the rewritable non-volatile memory module 106 may also be a single level cell (SLC) NAND flash memory module, any other suitable flash memory module, or any other memory module having the same characteristics.

Figure 3:
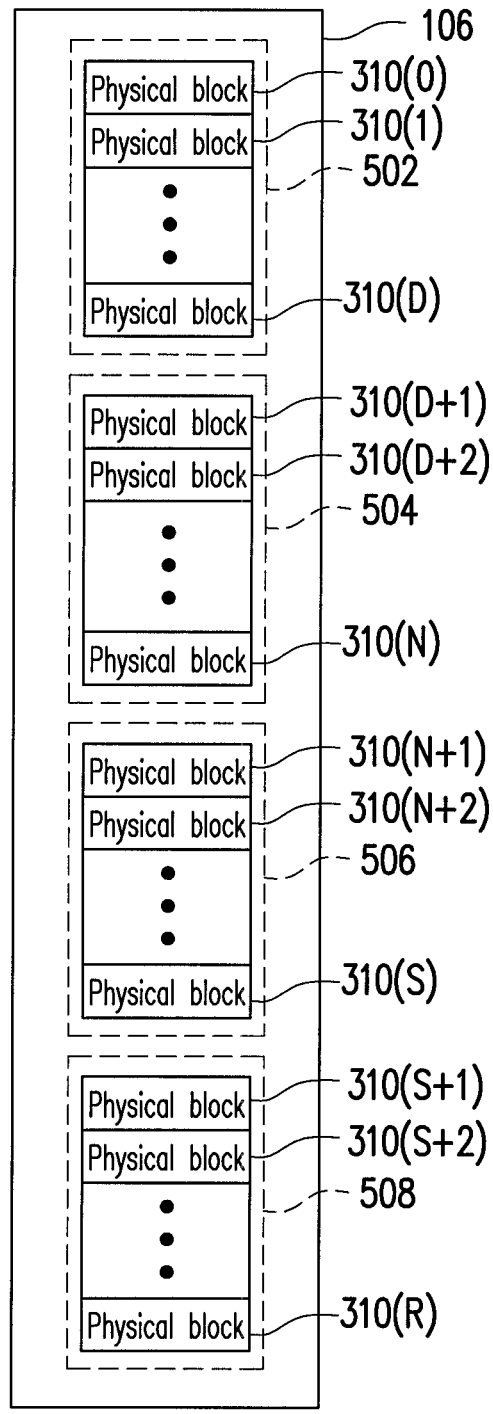
FIG. 3 and FIG. 4 are diagrams of managing physical blocks according to the first exemplary embodiment of the invention.
Figure 4:
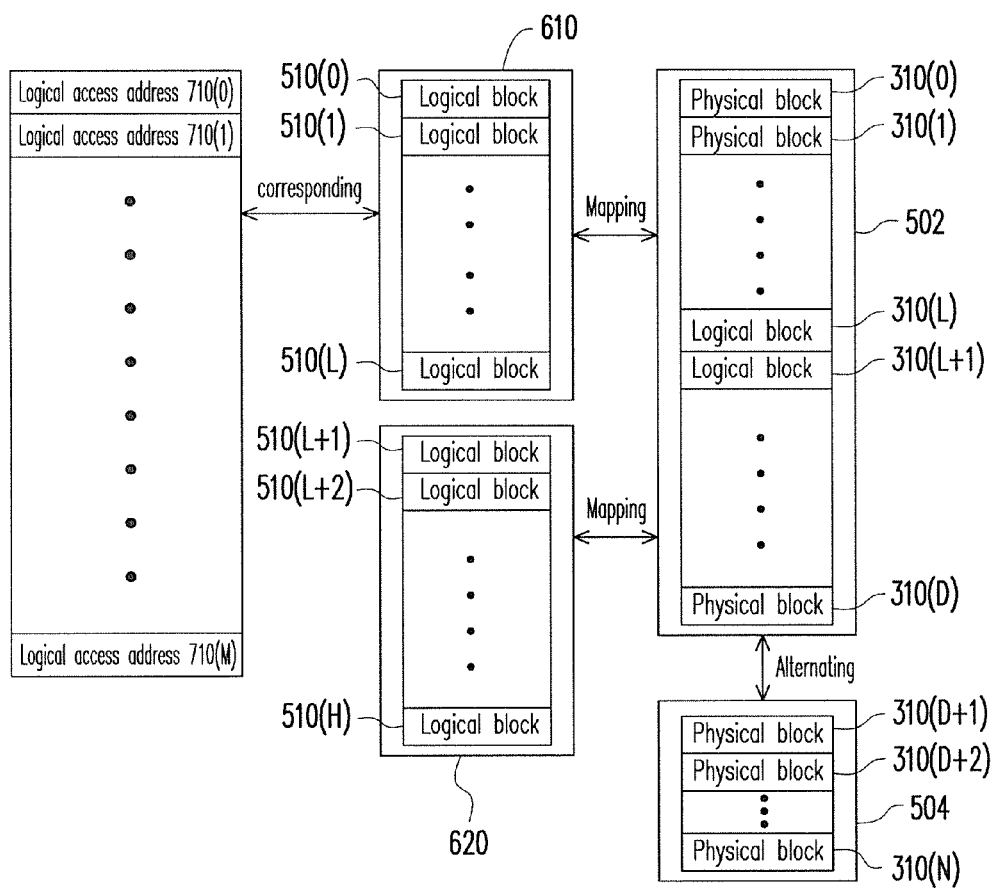

FIG. 3 and FIG. 4 are diagrams of managing physical blocks according to the first exemplary embodiment of the invention.

Referring to FIG. 3, the memory controller 104 from FIG. 2 logically groups the physical blocks 310(0)-310(R) into a data area 502, a spare area 504, a system area 506, and a replacement area 508.

Physical blocks logically belonging to the data area 502 and the spare area 504 are used for storing data. To be specific, the physical blocks in the data area 502 already contain data, while the physical blocks in the spare area 504 are used for substituting the physical blocks in the data area 502. Thus, the physical blocks in the spare area 504 are either blank or available physical blocks (i.e., no data is recorded therein or data recorded therein is already marked as invalid data). Namely, the physical blocks in the spare area 504 have been erased, or when a physical block is selected from the spare area 504 and used for storing data, an erasing operation will be performed on the selected physical block before it is used for storing data. Thus, the physical blocks in the spare area 504 are available physical blocks.

Physical blocks logically belonging to the system area 506 are used for recording system data, such as the manufacturer and model of the rewritable non-volatile memory module, the number of physical blocks in the rewritable non-volatile memory module, and the number of physical pages in each physical block.

Physical blocks logically belonging to the replacement area 508 are used for replacing damaged physical blocks. For example, when the rewritable non-volatile memory module 106 is manufactured, 4% of its physical blocks are reserved for replacement purpose. Namely, when the physical blocks in the data area 502, the spare area 504, and the system area 506 are damaged, the physical blocks in the replacement area 508 are used for replacing the damaged physical blocks. Thus, if there are still normal physical blocks in the replacement area 508 and a physical block is damaged, the memory controller 104 selects a normal physical block from the replacement area 508 to replace the damaged physical block. If there are no more normal physical block in the replacement area 508 and a physical block is damaged, the memory controller 104 announces that the memory storage apparatus 100 is in a write protect status and can not be used for writing data any more.

Particularly, the numbers of physical blocks in the data area 502, the spare area 504, the system area 506, and the replacement area 508 vary with different memory specifications. In addition, during the operation of the memory storage apparatus 100, the physical blocks grouped into the data area 502, the spare area 504, the system area 506, and the replacement area 508 are dynamically changed. For example, when a physical block in the spare area 504 is damaged and replaced by a physical block selected from the replacement area 508, the physical block originally in the replacement area 508 is associated with the spare area 504.

Referring to FIG. 4, as described above, the physical blocks in the data area 502 and the spare area 504 are alternatively used for storing data written by the host system 1000. In the present exemplary embodiment, the memory controller 104 configures logical blocks 510(0)-510(H) for mapping to foregoing physical blocks which are alternatively used for storing data. In particular, the memory controller 104 divides the logical blocks 510(0)-510(H) into a first partition 610 containing the logical blocks 510(0)-510(L) and a second partition 620 containing the logical blocks 510(L+1)-510(H).

Herein the first partition 610 is a partition to be identified and accessed by the host system 1000. For example, when the memory storage apparatus 100 is coupled to the host system 1000, after the handshaking procedure, the host system 1000 identifies that the memory storage apparatus 100 is a mass storage apparatus and the accessible space therein is the first partition 610.

The memory controller 104 maps logical pages of the logical blocks 510(0)-510(L) to the logical access addresses 710(0)-710(M) that are accessed by the host system 1000 in order to allow the host system 1000 to access data. For example, initially, the memory controller 104 maps the logical blocks 510(0)-510(L) belonging to the first partition 610 to the physical blocks of the data area 502. To be specific, after the memory storage apparatus 100 is manufactured, the logical blocks 510(0)-510(L) are respectively mapped to the physical blocks 310(0)-310(L) in the data area 502. Namely, one logical block is mapped to one physical block in the data area 502. Herein the memory controller 104 establishes a logical block-physical block mapping table to record the mapping relationship between the logical blocks and the physical blocks. Namely, the memory controller 104 converts the logical access addresses to be accessed by the host system 1000 into logical pages of corresponding logical blocks so that data in the physical pages can be accessed according to the logical block-physical block mapping table.

The second partition 620 is a storage area for a special purpose. For example, in an exemplary embodiment of the invention, the second partition 620 is used for storing security data encrypted through a very complicated encryption mechanism (for example, a level 3 or higher level encryption mechanism conforming to the Federal Information Processing Standards (FIPS) 140-2 or EMV EL), and the host system 1000 can only access data in the second partition 620 through special communication software and identity recognition. Namely, when the memory storage apparatus 100 is coupled to the host system 1000, the file system of the host system 1000 cannot recognize the second partition 620. The second partition 620 may be used as a data storage area of a smart card application program, wherein the host system 1000 can only access the security data in the second partition 620 by using the smart card application program and through identity recognition.

Figure 5:
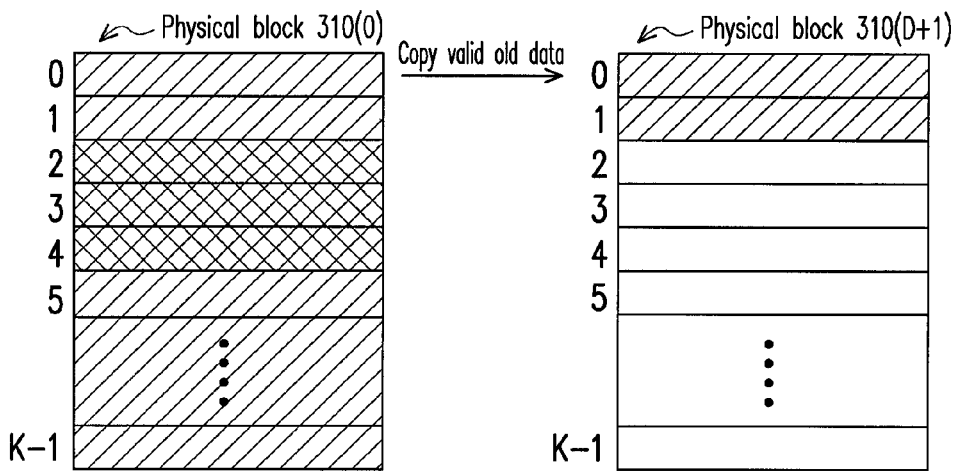
FIGS. 5-7 illustrate an example of a data writing operation according to the first exemplary embodiment of the invention.
Figure 6:
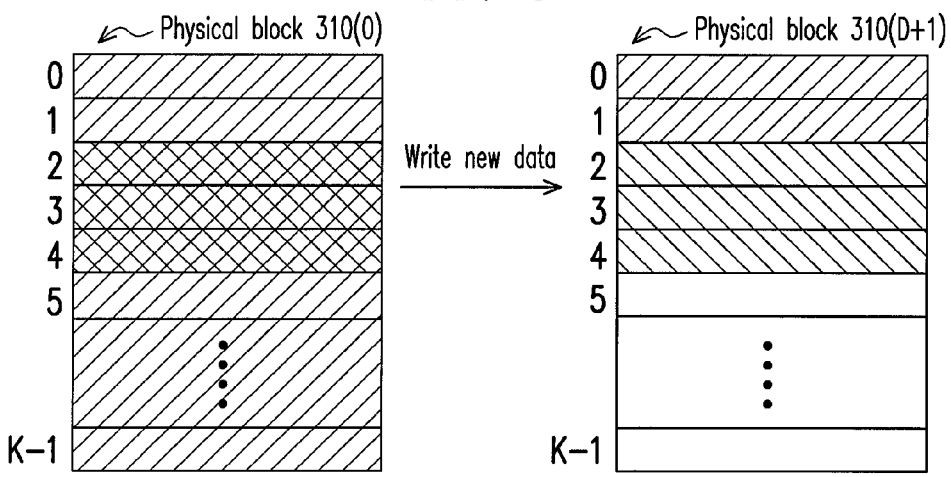
Figure 7:
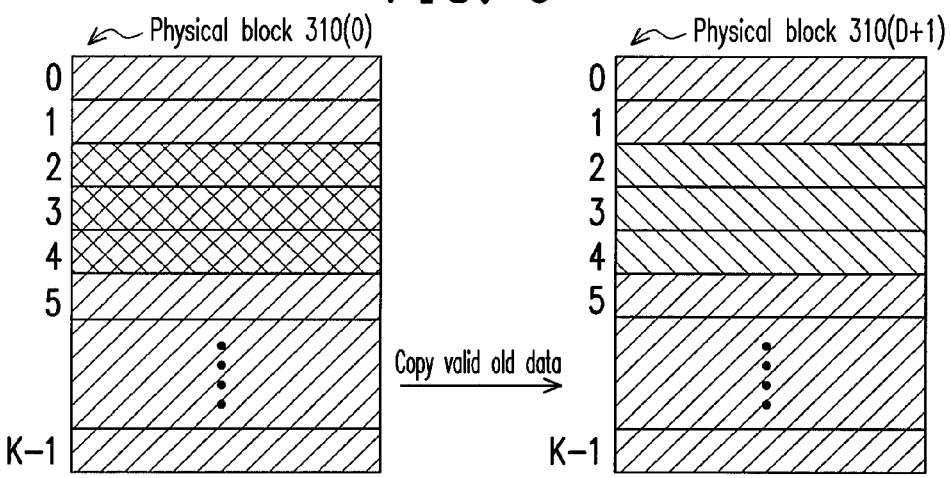

FIGS. 5-7 illustrate an example of a data writing operation according to the first exemplary embodiment of the invention. Herein it is assumed that data is written into a logical block in the first partition 610. However, the operation pattern is also applicable to writing data into a logical block in the second partition 620.

Referring to FIGS. 5-7, when the logical block 510(0) is mapped to the physical block 310(0) and the memory controller 104 receives a write command from the host system 1000 therefore is about to write data into a logical page of the logical block 510(0), the memory controller 104 identifies that the logical block 510(0) is currently mapped to the physical block 310(0) according to the logical block-physical block mapping table and selects a physical block 310(D+1) from the spare area 504 as a substitution physical block for substituting the physical block 310(0). However, when the memory controller 104 writes the new data into the physical block 310(D+1), the memory controller 104 does not instantly move all valid data in the physical block 310(0) to the physical block 310(D+1) or erase the physical block 310(0). To be specific, the memory controller 104 first copies the valid data before the physical page for writing the new data in the physical block 310(0) (i.e., data in the $0^{th}$ physical page and the $1^{st}$ physical page of the physical block 310(0)) to the $0^{th}$ physical page and the $1^{st}$ physical page of the physical block 310(D+1) (as shown in FIG. 5) and writes the new data into the $2^{nd}$ to the $4^{th}$ physical pages of the physical block 310(D+1) (as shown in FIG. 6). At this time, the memory controller 104 has completed the data writing operation. Because the valid data in the physical block 310(0) may become invalid during a next operation (for example, a write command), instantly moving other valid data in the physical block 310(0) to the physical block 310(D+1) may become meaningless. In addition, because data has to be sequentially written into the physical pages of a physical block, at first the memory controller 104 only moves the valid data before the physical page for writing the new data (i.e., data in the $0^{th}$ physical page and the $1^{st}$ physical page of the physical block 310(0)) but not other valid data (i.e., data in the $5^{th}$ to the $(K-1)^{th}$ physical page of the physical block 310(0)).

In the present exemplary embodiment, the operation for maintaining such a temporary relationship is referred to as opening mother-child blocks, wherein the original physical block (for example, the physical block 310(0)) is referred to as a mother physical block, and the substitution physical block (for example, the physical block 310(D+1)) is referred to as a child physical block.

Subsequently, the memory controller 104 integrates the data in the physical block 310(0) and the physical block 310(D+1) into a physical block only when the data in the physical block 310(0) and the physical block 310(D+1) needs to be actually merged, so that the efficiency of using these physical blocks can be improved. Herein the operation for merging the mother-child blocks is referred to as a data merging procedure or closing mother-child blocks. For example, as shown in FIG. 7, while closing the mother-child blocks, the memory controller 104 copies remaining valid data in the physical block 310(0) (i.e., data in the $5^{th}$ to the $(K-1)^{th}$ physical page of the physical block 310(0)) to the $5^{th}$ physical page to the $(K-1)^{th}$ physical page of the substitution physical block 310(D+1) and then performs an erasing operation on the physical block 310(0) and associates the erased physical block 310(0) with the spare area 504. Meanwhile, the memory controller 104 associates the physical block 310(D+1) with the data area 502. Namely, the memory controller 104 re-maps the logical block 510(0) to the physical block 310(D+1) in the logical block-physical block mapping table. In addition, in the present exemplary embodiment, the memory controller 104 establishes a spare area physical block table (not shown) to record the physical blocks currently associated with the spare area.

It should be mentioned that because there is a limited number of physical blocks in the spare area 504, during the operation of the memory storage apparatus 100, the number of the currently-opened mother-child block sets is limited. Herein, one currently-opened mother-child block set contains one mother unit and at least one child unit that are corresponding to one logical unit. Thus, when the memory storage apparatus 100 receives a write command from the host system 1000, if the number of currently-opened mother-child sets reaches an upper limit value, the memory controller 104 needs to close at least one currently-opened mother-child block set, so as to execute the write command.

For example, if the memory storage apparatus 100 is a SD memory card, the upper limit value is set as 1. When it is in the situation illustrated in FIG. 6 and the memory controller 104 receives a write command from the host system 1000 therefore is about to write data into a logical access address in the logical block 510(1), the memory controller 104 has to close mother-child blocks (as shown in FIG. 7) and then selects a physical block from the spare area 504 to open mother-child block (as shown in FIGS. 5-6) and write the data.

Figure 8:
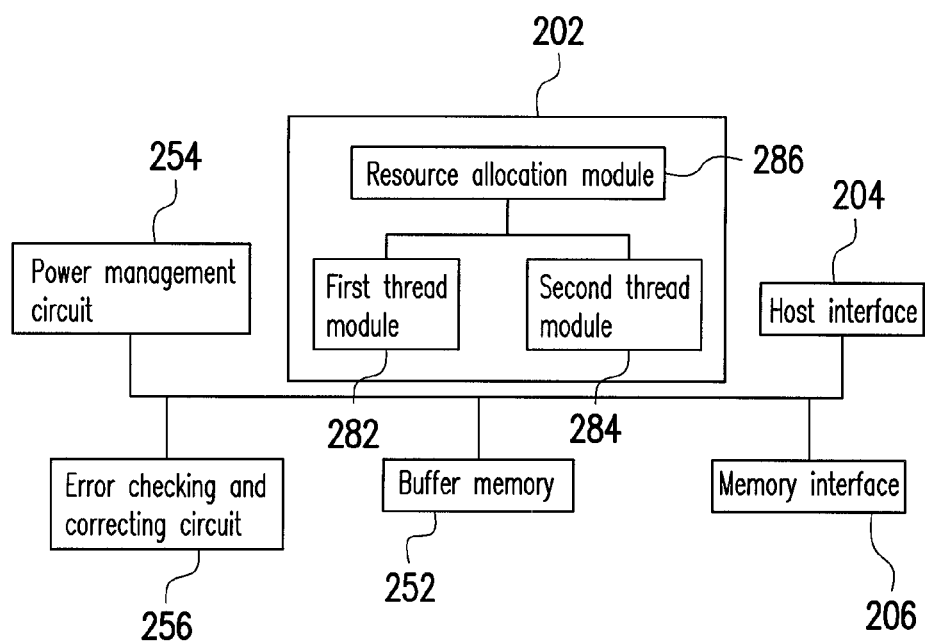
FIG. 8 is a schematic block diagram of a memory controller according to the first exemplary embodiment of the invention.

FIG. 8 is a schematic block diagram of a memory controller according to the first exemplary embodiment of the invention.

Referring to FIG. 8, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage apparatus 100 is in operation, the control instructions are executed to perform various data operations in the rewritable non-volatile memory module 106. Particularly, in the present exemplary embodiment, the control instructions of the memory management circuit 202 are executed as a plurality of threads to perform the data operations in the rewritable non-volatile memory module 106.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit to carry out various data operations.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has a driving code segment. When the memory controller 104 is enabled, the microprocessor unit first executes the driving code segment to load the control instructions from the rewritable non-volatile memory module 106 into the RAM of the memory management circuit 202. Thereafter, the microprocessor unit runs the control instructions to perform various data operations. Moreover, in yet another exemplary embodiment of the invention, the control instructions of the memory management circuit 202 may also be implemented in a hardware form.

The host interface 204 is coupled to the memory management circuit 202 and configured to receive and identify commands and data from the host system 1000. Namely, commands and data transmitted by the host system 1000 are transmitted to the memory management circuit 202 through the host interface 204. In the present exemplary embodiment, the host interface 204 is, corresponding to the connector 102, a SD interface. However, the invention is not limited thereto, and the host interface 204 may also be a USB interface, a PATA interface, an IEEE 1394 interface, a PCI express interface, a SATA interface, a MS interface, a MMC interface, a CF interface, an IDE interface, or any other suitable data transmission interface.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the invention, the memory controller 104 further includes a buffer memory 252. The buffer memory 252 is coupled to the memory management circuit 202 and configured to temporarily store data and commands from the host system 1000 or data from the rewritable non-volatile memory module 106.

In an exemplary embodiment of the invention, the memory controller 104 further includes a power management circuit 254. The power management circuit 254 is coupled to the memory management circuit 202 and configured to control power supply of the memory storage apparatus 100.

In an exemplary embodiment of the invention, the memory controller 104 further includes an error checking and correcting (ECC) circuit 256. The ECC circuit 256 is coupled to the memory management circuit 202 and configured to execute an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatile memory module 106. Subsequently, when the memory management circuit 202 reads data from the rewritable non-volatile memory module 106, it also reads the ECC code corresponding to the data, and the ECC circuit 256 executes the ECC procedure on the data according to the ECC code.

In the present exemplary embodiment, the memory management circuit 202 includes a first thread module 282, a second thread module 284, and a resource allocation module 286.

The first thread module 282 and the second thread module 284 access the rewritable non-volatile memory module 106 via the memory interface 206 and the data bus 106a. For example, in the present exemplary embodiment, the first thread module 282 individually manages and accesses the first partition 610, and the second thread module 284 individually manages and accesses the second partition 620. Namely, in the present exemplary embodiment, the first thread module 282 can access the first partition 610 but not the second partition 620, and the second thread module 284 can access the second partition 620 but not the first partition 610.

It should be mentioned that in the present exemplary embodiment, the first thread module 282 and the second thread module 284 both use the physical blocks in the data area 502 and the spare area 504 for writing data to be stored into the logical blocks in the first partition 610 and the second partition 620. Thus, the first thread module 282 and the second thread module 284 access the physical blocks of the rewritable non-volatile memory module 106 based on the same memory management rule (as shown in FIGS. 3-7).

However, in another exemplary embodiment of the invention, the first thread module 282 and the second thread module 284 may also access the physical blocks of the rewritable non-volatile memory module 106 based on different memory management rules. For example, the physical blocks of the rewritable non-volatile memory module 106 may be categorized into physical blocks exclusively allocated to the first thread module 282 and physical blocks exclusively allocated to the second thread module 284, so that the first thread module 282 and the second thread module 284 can respectively group the physical blocks to be mapped to the logical blocks according to their own management rules.

In the present exemplary embodiment, the first thread module 282, compared to the second thread module 284, is configured to process commands (herein referred to as first commands) having a stricter requirement on data processing timeline. For example, the first thread module 282 executes access commands belonging to SD card commands or MMC commands from the host system 1000 to write data to be stored into the first partition 610 into the physical blocks or read data from the physical blocks mapped to the logical blocks in the first partition 610. In the present exemplary embodiment, the first thread module 282 is configured to execute commands having higher priorities. Namely, when the host system 1000 processes multiple programs at the same time (i.e. multitasking), the program or command currently processed by the first thread module 282 becomes a program or command that is currently in use (i.e., is executed in a foreground mode).

In the present exemplary embodiment, the second thread module 284, compared to the first thread module 282, is configured to process commands (herein referred to as second commands) having a more flexible requirement on data processing timeline. For example, the second thread module 284 executes access commands belong to smart card commands or USB commands. In the present exemplary embodiment, the second thread module 284 is configured to execute commands having lower priorities. Namely, when the host system 1000 processes multiple programs at the same time, the program or command currently processed by the second thread module 284 becomes a program or command that is not currently in use (i.e., is executed in a background mode). In another exemplary embodiment, an operating system of the host system 1000 passes the control right of a specific device only to the first thread module, while the control right over the specific device is automatically released from the second thread module.

To be specific, when the host system 1000 transmits a smart card command through a command-application protocol data unit (C-APDU) of a smart card application program to the memory storage apparatus 100, the memory management circuit 202 identifies the smart card command, and the second thread module 284 executes the smart card command in the background mode. Namely, when the second thread module 284 executes a command, the memory management circuit 202 still receives commands from the host system 1000 through the host interface 204. For example, when the second thread module 284 executes a write command to write data into a physical block mapped to a logical block in the second partition 620, the memory management circuit 202 can still receive access commands for accessing the first partition 610 from the host system 1000.

The resource allocation module 286 assigns an access executing right of the rewritable non-volatile memory module 106 to the first thread module 282 and the second thread module 284. To be specific, both the first thread module 282 and the second thread module 284 need to access the rewritable non-volatile memory module 106 via the memory interface 206 and the data bus 106a. Thus, in order to allow the access channel (i.e., the memory interface 206 and the data bus 106a) to alternatively transmit commands issued by the first thread module 282 and the second thread module 284, the resource allocation module 286 is configured to coordinate the use of the access channel. The resource allocation module 286 may be a real time operation system (RTOS). However, it should be understood that the invention is not limited thereto.

It should be mentioned that in the present exemplary embodiment, when the memory management circuit 202 receives an access command for accessing the first partition 610, the first thread module 282 has to complete the access command as soon as possible in order to avoid any timeout problem. As described above, when the second thread module 284 executes a write command in the background mode, the memory management circuit 202 can still receive an access command for accessing the first partition 610 from the host system 1000. If the first thread module 282 has to start to execute the access command after the second thread module 284 finishes the write command, timeout may occur in the memory storage apparatus 100.

For example, if the memory storage apparatus 100 is a SD memory card, the time for executing a write command must be shorter than 250 milliseconds (ms), while the time for executing a read command must be shorter than 150 ms. However, it usually takes 150 ms to perform aforementioned data merging procedure. For example, assuming that the first thread module 282 performs the data merging procedure to execute a write command after 150 ms (i.e., the time required by the second thread module 284 for executing a write command), the time for the first thread module 282 to complete the write command will exceed 250 ms. Moreover, assuming that the first thread module 282 executes a read command after 150 ms (i.e., the time required by the second thread module 284 for executing a write command), the time for the first thread module 282 to complete the read command will exceed 150 ms.

In order to avoid aforementioned timeout problem, in the present exemplary embodiment, when the second thread module 284 is about to execute a write command in the background mode to write data into a physical block, the resource allocation module 286 assigns the access executing right to the second thread module 284. After the second thread module 284 finishes writing data into a predetermined number of physical pages, the resource allocation module 286 requests the second thread module 284 to release the access executing right and determines whether to assign the access executing right to the first thread module 282.

To be specific, the rewritable non-volatile memory module 106 writes data in units of each physical page. Thus, the second thread module 284 divides the data to be written into a plurality of page data and transmits the page data one by one into the rewritable non-volatile memory module 106. Besides, after the second thread module 284 transmits a predetermined amount of page data to the rewritable non-volatile memory module 106, the resource allocation module 286 instantly requests the second thread module 284 to release the access executing right and determines whether the memory storage apparatus 100 receives an access command needed to be executed by the first thread module 282. When the access command needed to be executed by the first thread module 282 is received, the resource allocation module 286 assigns the access executing right to the first thread module 282 to temporarily stop the write command executed by the second thread module 284 in the background mode. After the first thread module 282 finishes executing the access command and releases the access executing right, the resource allocation module 286 assigns the access executing right to the second thread module 284, and the second thread module 284 continues to execute the write command to transmit another predetermined amount of page data to the rewritable non-volatile memory module 106. In the present exemplary embodiment, the predetermined number is 1. However, the invention is not limited thereto, and the predetermined number may be any number smaller than the number of physical pages (i.e., page number) in a physical block.

Because the second thread module 284 processes the write command in the background mode, no timeout problem is incurred in the memory storage apparatus 100 by delaying the time of the second thread module 284 for executing the write command.

Figure 9:
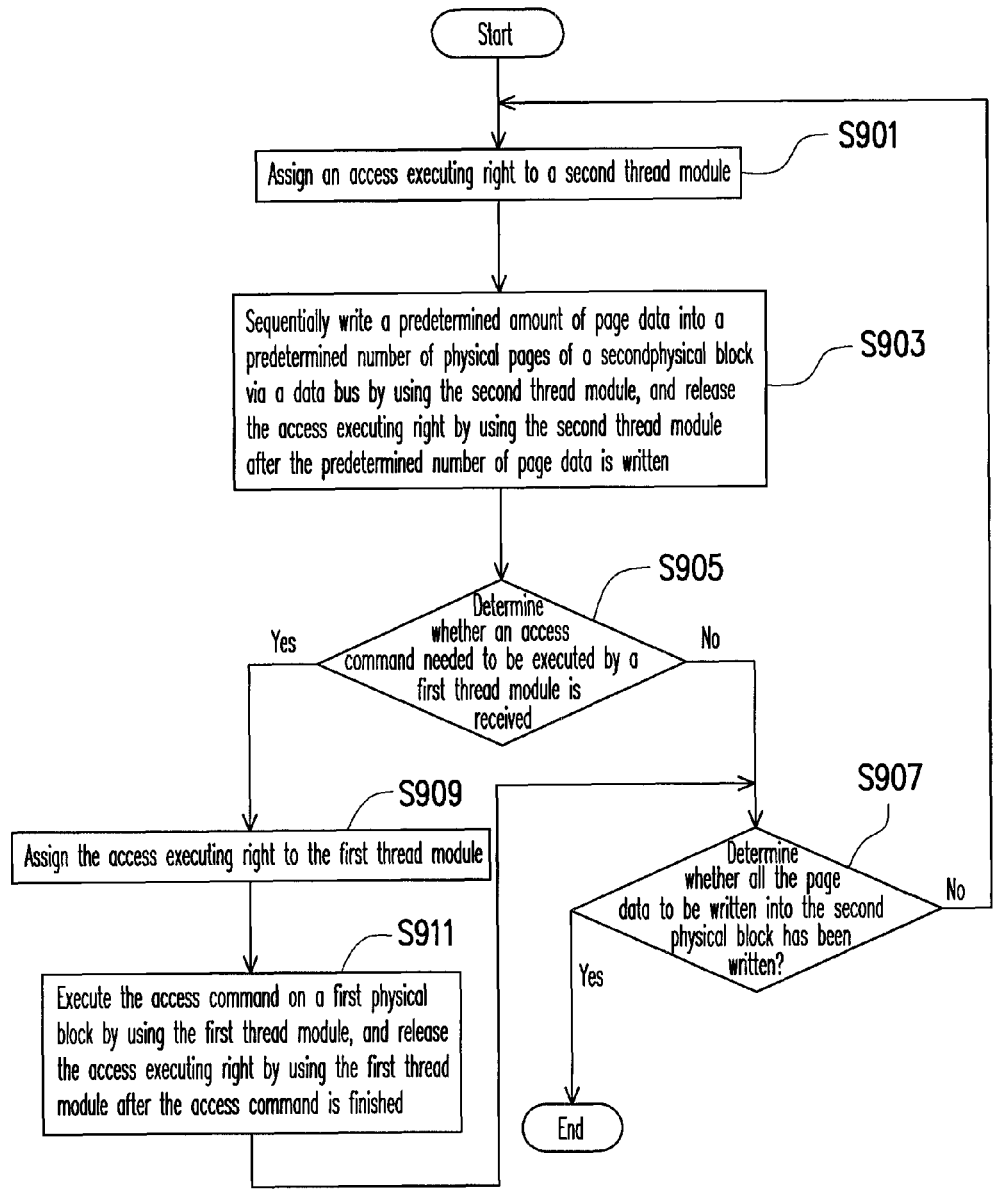
FIG. 9 is a flowchart of a data access method according to the first exemplary embodiment of the invention.

FIG. 9 is a flowchart of a data access method according to the first exemplary embodiment of the invention, wherein the steps of writing pieces of page data into a physical block (referred to as a second physical block thereinafter) when the second thread module 284 executes a write command in the background mode are illustrated.

Referring to FIG. 9, first, in step S901, the access executing right is assigned to the second thread module 284.

Then, in step S903, a predetermined amount of the page data is sequentially written by the second thread module 284 into a predetermined number of the physical pages in the second physical block via the data bus 106a, and the access executing right is released by the second thread module 284 after the predetermined amount of page data is written.

Next, in step S905, whether an access command to be executed by the first thread module 282 is received is determined.

If no access command to be executed by the first thread module 282 is received, in step S907, whether all the page data to be written into the second physical block has been written is determined.

If there is still unwritten page data in the page data to be written into the second physical block, step S901 is executed.

If all the page data has been written into the second physical block, the procedure in FIG. 9 is terminated.

If an access command to be executed by the first thread module 282 is received, in step S909, the access executing right is assigned to the first thread module 282. Besides, in step S911, the access command is executed by the first thread module 282 on a corresponding physical block (referred to as a first physical block thereinafter), and the access executing right is released by the first thread module 282 after the access command is finished. Thereafter, step S907 is executed.

[Second Exemplary Embodiment]

The memory storage apparatus and the host system in the second exemplary embodiment of the invention are substantially the same as those in the first exemplary embodiment. The only difference is that in the second exemplary embodiment, the resource allocation module of the memory controller assigns the access executing right by further taking the execution status of the second thread module into consideration. Below, the difference between the first exemplary embodiment and the second exemplary embodiment will be explained with reference to the drawings and reference numerals of the first exemplary embodiment.

In the second exemplary embodiment, when the second thread module 284 is about to execute a write command in the background mode to write page data into a physical block, the resource allocation module 286 assigns the access executing right to the second thread module 284. In particular, the resource allocation module 286 determines whether the number of unwritten page data in the page data to be written by the second thread module 284 into the physical block is smaller than a predetermined threshold.

If the amount of the unwritten page data is smaller than a predetermined threshold, the resource allocation module 286 assigns the access executing right to the second thread module 284, and the second thread module 284 releases the access executing right after writing the unwritten page data into the physical block.

If the amount of the unwritten page data is not smaller than the predetermined threshold, the resource allocation module 286 assigns the access executing right to the second thread module 284. Besides, after the second thread module 284 finishes the writing of one physical page, the resource allocation module 286 requests the second thread module 284 to release the access executing right and determines whether to assign the access executing right to the first thread module 282.

Namely, no timeout is incurred if the first thread module 282 executes the access command after the second thread module 284 finishes writing the unwritten page data into the physical block. In this case, the resource allocation module 286 directly assigns the access executing right to the second thread module 284 until the second thread module 284 completes the write command. Herein the predetermined threshold is determined according to the maximum delay time acceptable to the memory storage apparatus 100. For example, if the first thread module 282 needs to respond to a write command of the host system 1000 within 250 ms and requires 150 ms to execute the write command, the maximum delay time is 100 ms. Assuming that the second thread module 284 requires 2 ms to write one page data, the predetermined threshold is then set as 50. Thereby, it can be avoided to frequently assign and release the access executing right.

Figure 10:
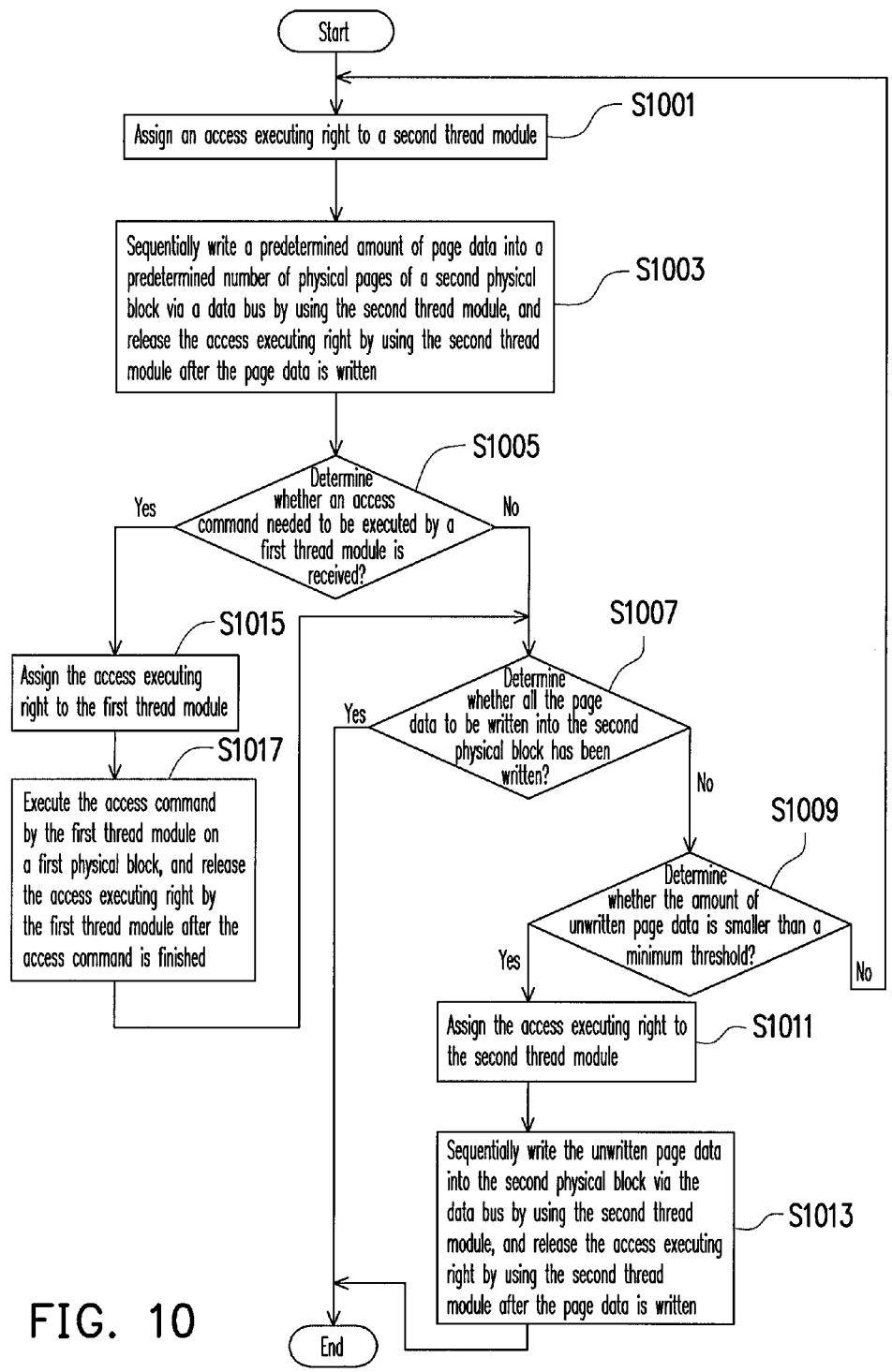
FIG. 10 is a flowchart of a data access method according to a second exemplary embodiment of the invention.

FIG. 10 is a flowchart of a data access method according to the second exemplary embodiment of the invention, wherein the steps of writing page data into a physical block (referred to as a second physical block thereinafter) when the second thread module 284 executes a write command in the background mode are illustrated.

Referring to FIG. 10, first, in step S1001, the access executing right is assigned to the second thread module 284.

Then, in step S1003, a predetermined amount of page data is sequentially written by the second thread module 284 into a predetermined number of physical pages of the second physical block via the data bus 106*a*, and the access executing right is released by the second thread module 284 after the page data is written.

Next, in step S1005, whether an access command to be executed by the first thread module 282 is received is determined.

If no access command to be executed by the first thread module 282 is received, in step S1007, whether all the page data to be written into the second physical block has been written is determined.

If there is still unwritten page data in the page data to be written into the second physical block, in step S1009, whether the amount of the unwritten page data is smaller than a minimum threshold.

If the amount of the unwritten page data is not smaller than the minimum threshold, step S1001 is executed.

If the amount of the unwritten page data is smaller than the minimum threshold, in step S1011, the access executing right is assigned to the second thread module 284. Next, in step S1013, the unwritten page data is sequentially written by the second thread module 284 into the second physical block via the data bus 106*a*, and the access executing right is released by the second thread module 284 after the page data is written.

If all the page data to be written into the second physical block has been written, the procedure in FIG. 10 is terminated.

If it is determined in step S1005 that an access command to be executed by the first thread module 282 is received, in step S1015, the access executing right is assigned to the first thread module 282. Besides, in step S1017, the access command is executed by the first thread module 282 on a corresponding physical block (referred to as a first physical block thereinafter), and the access executing right is released by the first thread module 282 after the access command is finished. Thereafter, step S1007 is executed.

In summary, exemplary embodiments of the invention provide a data access method, a memory controller, and a memory storage apparatus, wherein timeout problem is avoided when a rewritable non-volatile memory module is accessed by multiple threads. The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data access method for accessing a rewritable non-volatile memory module through a plurality of thread modules, wherein the rewritable non-volatile memory module has a plurality of physical blocks, each of the physical blocks has a plurality of physical pages arranged with a sequence, the thread modules comprise a first thread module and a second thread module, and the second thread module executes a write command to write pieces of page data into a second physical block among the physical blocks, the data access method comprising:

determining whether an amount of unwritten page data among the page data is smaller than a predetermined threshold;

if the amount of the unwritten page data is smaller than the predetermined threshold, assigning the access executing right to the second thread module and writing the unwritten page data into the second physical block via a data bus by using the second thread module;

if the amount of the unwritten page data is not smaller than the predetermined threshold, assigning an access executing right to the second thread module, and writing a predetermined amount of page data among the page data into a predetermined number of physical pages among the physical pages of the second physical block via a data bus by using the second thread module, wherein the second thread module releases the access executing right after writing the predetermined amount of the page data into the second physical block via the data bus, and the predetermined amount of the page data is a part of the page data;

determining whether an access command needed to be executed by the first thread module is received after the second thread module releases the access executing right; and if the access command needed to be executed by the first thread module is received, assigning the access executing right to the first thread module and executing the access command on a first physical block among the physical blocks via the data bus by using the first thread module, wherein the first thread module releases the access executing right after executing the access command, wherein the first thread module is configured to execute a first command having a stricter requirement on a data processing timeline and the second thread module is configured to execute a second command having a more flexible requirement on the data processing timeline.

2. The data access method according to claim 1 further comprising:

after the first thread module releases the access executing right, assigning the access executing right to the second thread module and writing another predetermined amount of page data among the page data into another predetermined number of physical pages among the physical pages of the second physical block via the data bus by using the second thread module, wherein the second thread module releases the access executing right after writing the another predetermined number of the page data into the second physical block via the data bus.

3. The data access method according to claim 1 further comprising:

when the access command to be executed by the first thread module is not received, assigning the access executing right to the second thread module and writing another predetermined amount of page data among page data into another predetermined number of physical pages among the physical pages of the second physical block via the data bus by using the second thread module, wherein the second thread module releases the access executing right after writing the another predetermined number of the page data into the second physical block via the data bus.

4. The data access method according to claim 1 further comprising:

configuring a plurality of logical blocks to be mapped to at least a portion of the physical blocks;

dividing the logical blocks into a first partition and a second partition;

exclusively accessing the physical blocks mapped to the logical blocks in the first partition by using the first thread module; and exclusively accessing the physical blocks mapped to the logical blocks in the second partition by using the second thread module, wherein the first physical block is mapped to one of the logical blocks of the first partition, and the second physical block is mapped to one of the logical blocks of the second partition.

5. The data access method according to claim 1 further comprising:

processing the first command by using the first thread module; and processing the second command by using the second thread module, wherein when both the first command and the second command need to be processed, the first command is prior to the second command, wherein the access command belongs to the first command.

6. A memory controller for controlling a rewritable non-volatile memory module, wherein the rewritable non-volatile memory module has a plurality of physical blocks, and each of the physical blocks has a plurality of physical pages arranged with a sequence, the memory controller comprising:

a memory interface, configured to couple to the rewritable non-volatile memory module; and a memory management circuit, coupled to the memory interface and configured to execute a write command to write pieces of page data into a second physical block among the physical blocks, wherein the memory management circuit comprises a first thread module, a second thread module, and a resource allocation module coupled to the first thread module and the second thread module, and the first thread module is configured to execute a first command having a stricter requirement on a data processing timeline and the second thread module is configured to execute a second command having a more flexible requirement on the data processing timeline, wherein the resource allocation module determines whether an amount of unwritten page data among the page data is smaller than a predetermined threshold;

if the amount of the unwritten page data is smaller than the predetermined threshold, assigns the access executing right to the second thread module and writing the unwritten page data into the second physical block via a data bus by using the second thread module;

if the amount of the unwritten page data is not smaller than the predetermined threshold, assigns an access executing right to the second thread module, and the second thread module writes a predetermined amount of page data among the page data into a predetermined number of physical pages among the physical pages of the second physical block via a data bus, wherein the second thread module releases the access executing right after writing the predetermined number of the page data into the second physical block via the data bus, and the predetermined amount of the page data is a part of the page data;

after the second thread module releases the access executing right, the resource allocation module determines whether an access command needed to be executed by the first thread module is received; and if the access command needed to be executed by the first thread module is received, the resource allocation module assigns the access executing right to the first thread module, and the first thread module executes the access command on a first physical block among the physical blocks via the data bus, wherein the first thread module releases the access executing right after executing the access command.

7. The memory controller according to claim 6, wherein after the first thread module releases the access executing right, the resource allocation module assigns the access executing right to the second thread module, and the second thread module writes another predetermined number of page data among the page data into another predetermined number of physical pages among the physical pages of the second physical block via the data bus, wherein the second thread module releases the access executing right after writing the another predetermined number of the page data into the second physical block via the data bus.

8. A memory storage apparatus, comprising:
a rewritable non-volatile memory module, having a plurality of physical blocks, wherein each of the physical blocks has a plurality of sequentially arranged physical pages; and
a memory controller, coupled to a connector and the rewritable non-volatile memory module, wherein the memory controller comprises a host interface, a memory interface configured to couple to the rewritable non-volatile memory module, and a memory management circuit coupled to the memory interface,
wherein the memory management circuit executes a write command to write pieces of page data into a second physical block among the physical blocks,
wherein the memory management circuit comprises a first thread module, a second thread module, and a resource allocation module coupled to the first thread module and the second thread module, and the first thread module is configured to execute a first command having a stricter requirement on a data processing timeline and the second thread module is configured to execute a second command having a more flexible requirement on the data processing timeline,
wherein the resource allocation module determines whether an amount of unwritten page data among the page data is smaller than a predetermined threshold;
if the amount of the unwritten page data is smaller than the predetermined threshold, assigns the access executing right to the second thread module and writing the unwritten page data into the second physical block via a data bus by using the second thread module;
if the amount of the unwritten page data is not smaller than the predetermined threshold, assigns an access executing right to the second thread module, and the second thread module writes a predetermined amount of page data among the page data into a predetermined number of physical pages among the physical pages of the second physical block via a data bus, wherein the second thread module releases the access executing right after writing the predetermined number of the page data into the second physical block via the data bus, and the predetermined amount of the page data is a part of the page data;
the resource allocation module determines whether an access command needed to be executed by the first thread module is received after the second thread module releases the access executing right; and
if the access command needed to be executed by the first thread module is received, the resource allocation module assigns the access executing right to the first thread module and the first thread module executes the access command on a first physical block among the physical blocks via the data bus, wherein the first thread module releases the access executing right after executing the access command.

9. The memory storage apparatus according to claim 8, wherein after the first thread module releases the access executing right, the resource allocation module assigns the access executing right to the second thread module and the second thread module writes another predetermined amount of page data among the page data into another predetermined number of physical pages among the physical pages of the second physical block via the data bus,
wherein the second thread module releases the access executing right after writing the another predetermined number of the page data into the second physical block via the data bus.

10. The memory storage apparatus according to claim 8, wherein when the access command needed to be executed by the first thread module is not received, the resource allocation module assigns the access executing right to the second thread module and the second thread module writes another predetermined amount of page data among the page data into another predetermined number of physical pages among the physical pages of the second physical block via the data bus,
wherein the second thread module releases the access executing right after writing the another predetermined number of the page data into the second physical block via the data bus.

11. The memory storage apparatus according to claim 8, wherein the memory management circuit configures a plurality of logical blocks to be mapped to at least a portion of the physical blocks and divides the logical blocks into a first partition and a second partition,
wherein the first thread module exclusively accesses the physical blocks mapped to the logical blocks in the first partition,
wherein the second thread module exclusively accesses the physical blocks mapped to the logical blocks in the second partition,
wherein the first physical block is mapped to one of the logical blocks in the first partition, and the second physical block is mapped to one of the logical blocks in the second partition.

12. The memory storage apparatus according to claim 8, wherein when both the first thread module and the second thread module need to be executed, the first thread module executes in a foreground mode and the second thread module is executes in a background mode.

* * * * *